United States Patent [19]
Grass et al.

[11] Patent Number: 6,056,095
[45] Date of Patent: May 2, 2000

[54] VEHICLE HAVING AN AUTOMATICALLY ACTUATED CLUTCH

[75] Inventors: Thomas Grass, Urbach; Franz Kosik, Ostfildern, both of Germany

[73] Assignee: DaimlerChrysler AG, Stuttgart, Germany

[21] Appl. No.: 09/174,849

[22] Filed: Oct. 19, 1998

[30] Foreign Application Priority Data

Oct. 17, 1997 [DE] Germany ............ 197 45 673

[51] Int. Cl.[7] ................................................ B60K 41/22
[52] U.S. Cl. .......................................... 192/3.58; 192/3.62
[58] Field of Search ......................... 192/3.54, 3.57, 192/3.58, 3.65, 3.61, 3.62, 3.55

[56] References Cited

U.S. PATENT DOCUMENTS

| | | | |
|---|---|---|---|
| 3,910,388 | 10/1975 | Moori et al. | 192/3.56 |
| 4,158,404 | 6/1979 | Yamashita et al. | 192/3.58 |
| 4,267,907 | 5/1981 | Hiraiwa | 192/3.56 |
| 4,344,514 | 8/1982 | Fujihara et al. | 192/3.58 |
| 4,723,642 | 2/1988 | Grunberg et al. | 192/3.55 |
| 5,029,683 | 7/1991 | Grunberg et al. | 192/3.55 |
| 5,038,901 | 8/1991 | Parsons et al. | 192/3.55 |

FOREIGN PATENT DOCUMENTS 43 41 729   6/1994   Germany .

Primary Examiner—Rodney H. Bonck
Assistant Examiner—Saúl Rodríguez
Attorney, Agent, or Firm—Kenyon & Kenyon

[57] ABSTRACT

In a vehicle in whose drive train a manually shifted transmission with automated clutch actuation is located, in order to suppress improper actuations of the clutch, an inhibition time is applied to the signal activating an intended shifting function.

9 Claims, 3 Drawing Sheets

VEHICLE HAVING AN AUTOMATICALLY ACTUATED CLUTCH

FIELD OF THE INVENTION

The present invention concerns a vehicle having an automatically actuated clutch located in the drive train between the engine and manually shifted transmission.

RELATED TECHNOLOGY

In vehicles having an automatically actuated clutch, the clutch is actuated not via a separate clutch pedal, but rather automatically as a function of and in parallel with the shifting operation brought about via the manual shift lever. The driver's particular shifting input is derived from the movements imposed upon, or forces exerted by, the driver on the shift lever, and converted into corresponding control signals for the clutch, so that the clutching operation and shifting operation occur in a manner correspondingly matched to one another. Sensing of the movements imposed and/or forces exerted upon the shift lever is accomplished via corresponding sensors, the sensors emitting—as a function of positions, relative positions, forces, travels, velocities, and/or accelerations that are sensed—signals which are converted either directly, or indirectly after corresponding processing, into control signals for the clutch. Sensing need not occur directly at the shift lever, but can also be performed at another point in the shift linkage. Relative movements and relative accelerations between parts of the shift linkage, and/or transmission-side and/or body-side articulations of the shift linkage and/or shift lever, can also be converted into shift signals. For example, the travel difference between shifter-side and transmission-side sensor suites can be converted into corresponding signals.

In the context of practical use of the vehicle, however, the shift lever is not always manipulated in an optimal fashion directed toward the shifting function. Rather it is sometimes, in accordance with particular driving habits, misused as a hand rest or support. In addition, abrupt driving maneuvers, necessary braking operations, and the like, both irrespective of shifting operations and in the context thereof, result in shift lever actuations which in some cases lie well outside the norm in terms of the forces exerted and the rapidity of the shifting movement. For example, the driver may exert force and overpush the shift lever and then release it in the overpushed position, with the result that springback movements occur. These springback movements are in some cases entirely comparable to deliberately initiated shifting movements, thus creating the possibility for confusion. Similarly, rapid gear ratio selection can lead to misinterpretations. This may occur if, because predefined velocity, acceleration, and/or force thresholds are exceeded, the sensor suite employed senses values which are comparable to those in the context of deliberate execution of a shifting operation and which thus suggest a shifting intent. From this viewpoint, the mass relationships in the shifter and transmission, with the elasticities existing between them, can also be source of incorrect evaluations, for example due to swingbacks after the shift lever is released.

German Patent Application No. 43 41 729 A1 presents a prior solution, in which an automated clutch is used in conjunction with a shiftable transmission of a motor vehicle to prevent unintentional actuations of the clutch in the release direction due to the use of the gear selection lever as a hand rest. A sensing suite is provided in which the forces exerted on the selector lever are sensed as to direction, and signals derived therefrom are subsequently compared for plausibility with transmission positions. Only when such plausibility exists, i.e., when a concrete shifting intent is detected, are clutching operations initiated. In the further course thereof, if the preconditions for engaging the clutch are declared and present, a relevant signal is forwarded to the clutch control device after a delay. The delay time is dimensioned so that tolerances possibly present in the sensing suite and in the shifting mechanism cannot cause the clutch to engage before the shifting operation is complete on the transmission side. The actual clutching operation is spread out in order to prevent transmission damage.

SUMMARY OF THE INVENTION

An object of the present invention is to ensure that irregularities in the manipulation of a gear selection or shift lever, as discussed above, do not result in actuations of the clutch not in coordination with intentional shifting operations.

The present invention provides a vehicle having an automatically actuated clutch located in the drive train between engine and manually shifted transmission, in which the clutching operation is triggered via the shift lever of the transmission synchronously with the respective shifting operation that is initiated. The respective shifting intent is detectable from signals that can be activated via the shift lever, directly or indirectly, as a function of position, relative position, force, travel, velocity, and/or acceleration. Signals corresponding to reference positions of the shift lever (11), for functions to be activated via those signals, activate an inhibition time if the shifting intent is detected on the basis of or in conjunction with a deviation from the reference or normal state of the shift lever (11) and/or of the actuation linkage (9) connected therewith.

It is assumed that the shifting intent in the context of a deliberately performed shifting operation is the starting point for a correspondingly deliberately performed shift movement. A signal corresponding to the shifting intent for a deliberate shifting operation is confirmed, in the case of a deliberate shifting operation, by further corresponding signals, while corresponding signals not resulting from a deliberate intention to shift remain isolated. A corresponding inhibition time, during which the functions corresponding to the activating signals are suppressed, results. These functions are not implemented if, in the context of the inhibition time, the criterion for the signal being addressed, and thus that signal or some other confirmation thereof, is absent.

It proves advantageous if the inhibition time is activated when the shift lever is in the overpushed position or the gear ratio has just been selected.

The overpushed position of the shift lever can be detected, for example, by the detection of a corresponding (negative) force, or by a travel difference which suggests such a force. Another possibility for detecting overpush is to sense whether the shift lever is located outside its shift, or reference, position corresponding to the respective gear ratio, which is stored for the sensor system as a learned rest position, or a position that is adapted during operation. A deviant position of this kind can enable an indirect conclusion as to a preload, such as exists when the shift lever is in the overpushed position.

BRIEF DESCRIPTION OF THE DRAWINGS

The present invention is elucidated in the description below with reference to the drawings, in which.

DETAILED DESCRIPTION

Figure 1:
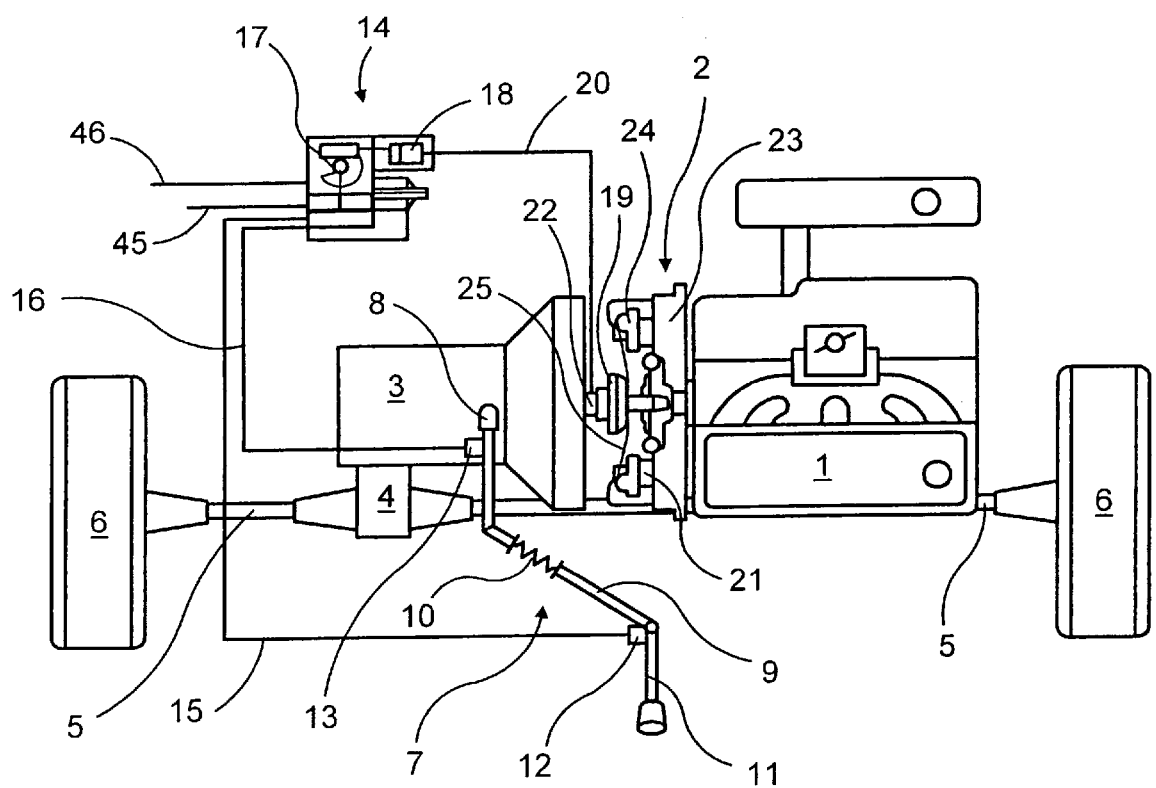
FIG. 1 shows the general configuration of a drive train of a motor vehicle, using the example of a transverse engine arrangement in which the engine and transmission are arranged, with the clutch between them, in the transverse direction of the vehicle.

FIG. 1 shows in diagram of the drive train of a motor vehicle, in particular a passenger car, the drive train in an arrangement lying transverse to the direction of travel. Engine 1 is connected via a clutch 2 to transmission 3, which in turn drives wheels 6 of an axle via a differential 4 and drive shafts 5 proceeding laterally therefrom. The pertinent wheel suspensions are not shown, nor are other elements of the vehicle, in which a drive train as described above may be installed as an assembled unit and constitutes the front axle of the vehicle.

Transmission 3 is a manually shifted transmission whose actuation linkage as a whole is designated 7. In the simplified exemplary embodiment depicted, actuation linkage 7 has on the transmission side a positioning lever 8. Positioning lever 8 may be guided in longitudinally displaceable and rotatable fashion with respect to transmission 3. The positioning movements required in transmission 3 for shifting operations are performed or initiated via positioning lever 8. Positioning lever 8 is connected via a transfer linkage 9 to shift lever 11 which may be arranged in the driver's compartment; the elasticities which may be provided in actuation linkage 7 and which in some cases are even necessary for kinematic reasons are symbolized by a spring 10 arranged in transfer linkage 9. Shift lever 11 may be guided, with respect to the positioning movements necessary for shifting operations, by a gate, which is not depicted here. Such a gate may, in accordance with the shift pattern selected, be a so-called H-gate, which typically has a first longitudinal slot for gear ratios following one another in the shifting operation, which is joined via a transverse slot to a second longitudinal slot. With reference to an H-shaped shift gate of this kind, in a particularly common arrangement the first and second gear ratios are associated with the first longitudinal slot and the third and fourth gear ratios to the second longitudinal slot, viewed from top to bottom in each case.

The corresponding positioning movements of shift lever 11 and of positioning lever 8, initiated thereby, are sensed via a sensor suite which has at least one sensor 12 associated with shift lever 11 to detect the shifting intent, and at least one sensor 13 associated with positioning lever 8 for gear ratio detection. The sensor suite, not depicted here in further detail, can comprise linear sensors, angular sensors, and other sensor elements operating on the basis of force or travel. The signals from these sensors are supplied to control system 14 for automatic actuation of clutch 2. The lines 15 and 16 connect sensors 12 and 13, respectively, to control system 14. Control system 14 is preferably connected via bus 45, which may be a so-called CAN bus, to further control devices of the vehicle, for example to the engine controller (not depicted). A further connection 46 leads to the vehicle's brake light, and serves for coupling with the braking system. Clutch travel sensor 17 and a transducer cylinder 18 form part of control system 14. Transducer cylinder 18 is addressed via a positioning motor and is connected to hydraulic central release bearing 19 of clutch 2 via a line 20. The clutch is otherwise of typical configuration and has a clutch disk 21 which is arranged nonrotatably on input shaft 22 of the transmission and lies between the engine-side flywheel 23 and a pressure plate 24. Pressure plate 24, when the clutch is engaged, is forced via spring device 25 in the direction of flywheel 2. To release the clutch, pressure plate 24 can be moved via central release bearing 19 and spring device 25 in the opposite direction, i.e., away from flywheel 23. In this way, corresponding to the open state of the clutch, clutch disk 21 can run in substantially unconstrained fashion between pressure plate 24 and flywheel 23.

From the forces exerted on shift lever 11 and the movements performed by shift lever 11 conclusions are drawn as to the shifting intent, taking into account the respective transmission position. Sensor 12, preferably by a rotation angle sensor, is used for detecting shifting intent. Transmission position is sensed via gear ratio detection sensor suite 13, a respective Hall sensor in the shift direction and the selection direction, for gear ratio detection.

Problems may occur if the manipulation of shift lever 11 by the driver is irregular, such as when shifting movements are performed very rapidly or very forcefully, or when the shift lever is used as a hand rest once a gear ratio has been selected. Forces are often also exerted unknowingly on shift lever 11, such as during acceleration. These forces may lead to overpushing to the respective end position in the respective shift slot. With reference to third gear, for example, the shift lever may be pushed, utilizing the elasticities symbolized by spring 10, in the shifting direction beyond the shift lever's end position. Such overpushing has no influence on the shifting operation in the transmission, but can lead to misinformation via the sensor suite.

Figure 2:
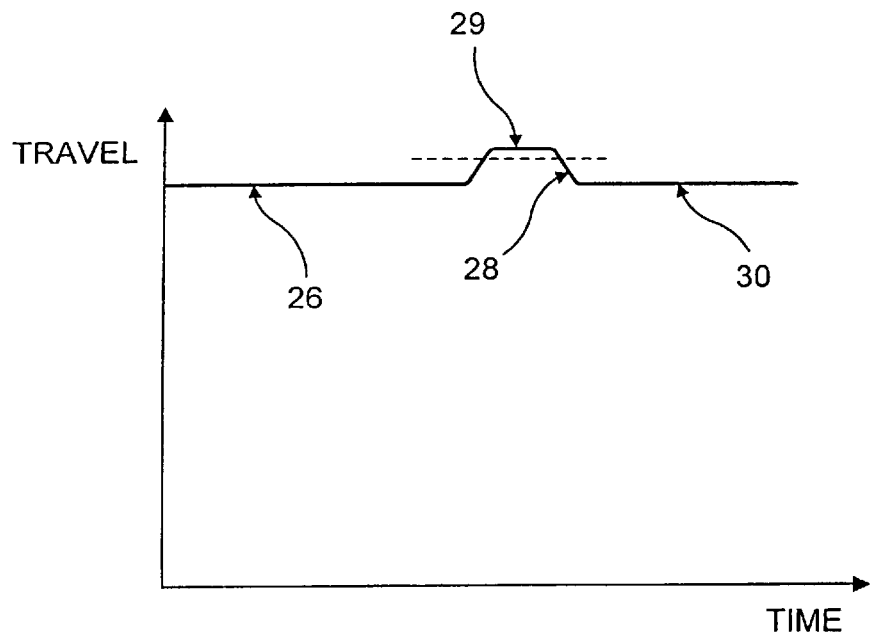
FIG. 2 shows a graph depicting a misinterpretation of a shifting intent during an overpush.
Figure 3:
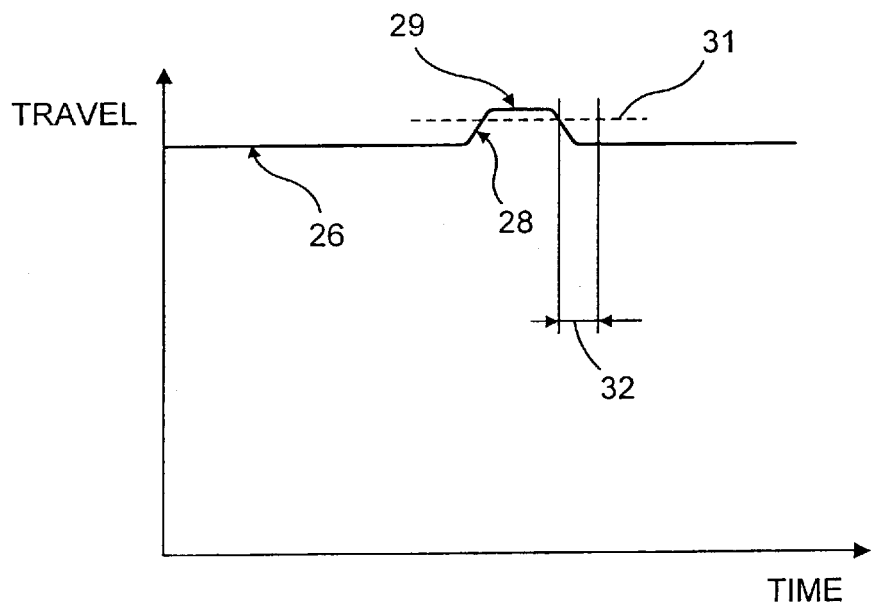
FIG. 3 shows a graph depicting an inhibition time which follows detection of the presumed shifting intent corresponding to FIG. 2.

FIGS. 2 and 3 each show a travel/time diagram in which the overpush situation with respect to a shift lever position is depicted.

For the overpush situation, it is assumed that a shift lever position corresponding to an engaged gear ratio exists, i.e., the shift lever has more or less reached a rest position and the shift lever does not execute any movement over time. This initial situation is symbolized in FIG. 2 by curve segment 26. It is possible because of the elasticities for shift lever 10 to be, as defined above, overpushed, i.e., pivoted out of this rest position in the respective shifting direction. The result is a displacement of the shift lever which is illustrated by curve 28 segment, line 29 indicating the overpushed end position reached by the shift lever. When shift lever 10 is then released, it springs back into the initial position because of the elastic loading, assuming a shift lever position symbolized, as an extension of line 26, by line 30. The distance traveled (line 26 to line 29) corresponds to the travel difference resulting from the elasticity between vehicle and transmission in the actuation linkage.

After shift lever 8 is released, the springback from the limit position (line 29) reached due to overpushing can result in accelerations which are understood as initiation of a shifting movement extending in the springback direction. A corresponding interpretation can, however, might also be reached purely on the basis of travel. The springback from the overpushed position is not, in fact, intended to initiate a new shifting operation, but simply indicates a normalization of the respective shift lever pressure.

In order to prevent such a misinterpretation from causing a corresponding improper function, i.e., release of the clutch, an inhibition time is applied to the function of the corresponding shifting intent detection system (sensor suite 12). This inhibition time is illustrated in FIG. 3. FIG. 3, which otherwise corresponds to FIG. 2, additionally shows that when shift lever 10 is overpushed beyond a rest position, an inhibition time for the shifting intent recognition system is imposed when the position displacement falls below a threshold, illustrated here by dashed line 31, in the springback direction. This inhibition time is depicted symbolically by numeral 32 in FIG. 3 as a fixed value, but can also be defined as a fixed value which is modified within predefined limits to adapt to other parameters.

Furthermore, it is also possible in the context of the present invention to make termination of the inhibition time dependent on the fact that a shifting intent which is initially incorrectly assumed on the basis of a springback is confirmed when the shifting operation is actually performed.

Figure 4:
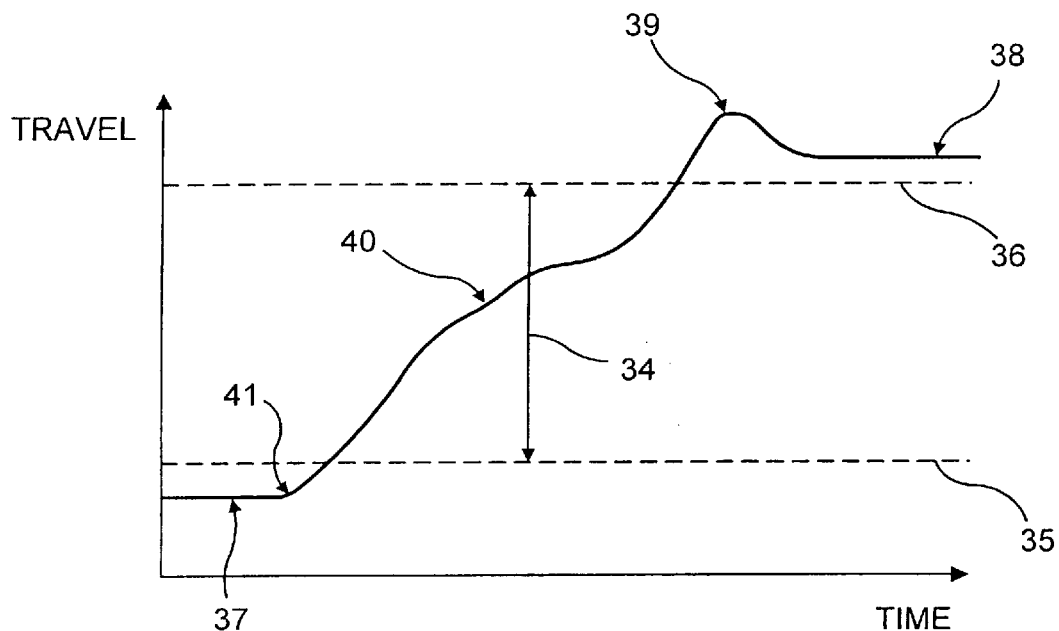
FIG. 4 shows a graph depicting a misinterpretation of a shifting intent during a gear ratio change.
Figure 5:
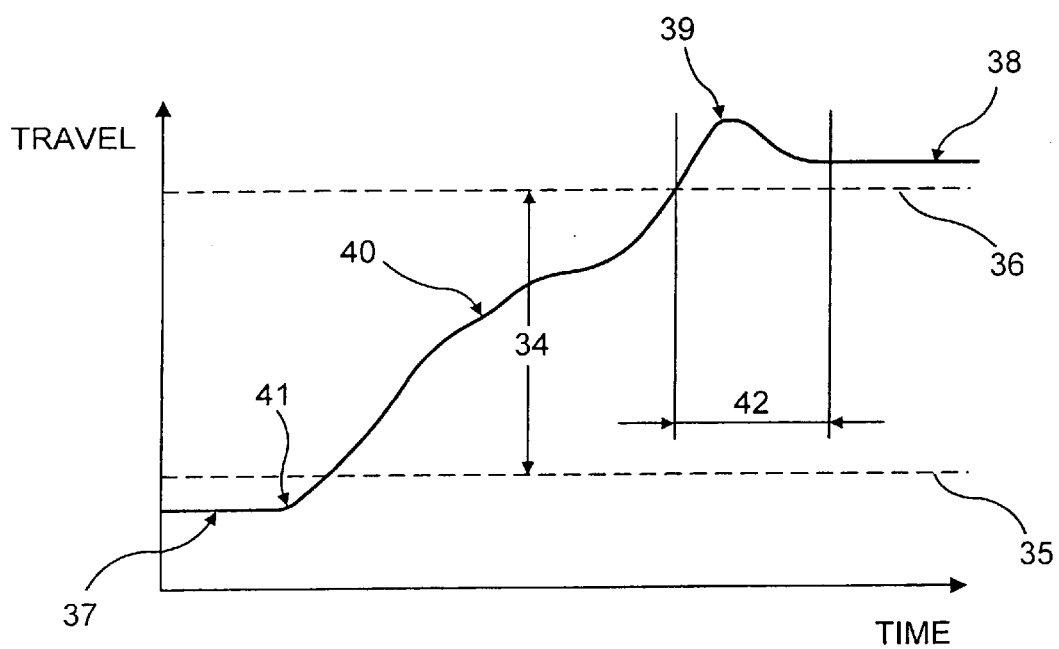
FIG. 5 shows a graph depicting, analogous to FIG. 3, an inhibition time following detection of the presumed shifting intent corresponding to FIG. 4.

Similar situations can occur when changing gear ratios, as illustrated in FIGS. 4 and 5. Dashed lines 35 and 36 define limit positions for the shift lever which are associated with a respective gear ratio, and between which is located a neutral region 34 which must be passed through as gear ratios are changed.

Proceeding from a position 37 corresponding to a shift lever in the rest position, limit position 35 for that gear ratio, and then neutral zone 34 are passed through. When limit position 36 for the gear ratio into which the system is to be shifted is exceeded, a rest position 38 corresponding to the shift lever position for that gear has almost been reached. During the movement sequence, however, rest position 38 may initially be overshot due to swingback or the like, so that, as with overpushing, an extreme position 39 is reached from which the shift lever swings back into rest position 38.

Detection of the shifting intent occurs during gear ratio changing in the region of the transition from the position corresponding to rest position 37 into transition region 40, the corresponding signal emission being symbolized by arrow 41. A corresponding movement sequence and corresponding accelerations occur when the shift lever returns from its overshot position 39 into rest position 38. In order to rule out any misinterpretation of this movement sequence as a shifting intent when such a shifting intent does not exist, according to the present invention an inhibition time is set, as symbolized in FIG. 5 by numeral 42. The inhibition time begins when the shift lever passes through limit position 36 associated with the corresponding gear ratio. In the case of an unchangeably predefined value, the inhibition time is preferably set so that the swingback operation is complete when the inhibition time ends. During the inhibition time, any interpretation of the respective activation signal for releasing the clutch is suppressed, i.e., the signal does not activate the corresponding function.

It is also possible to terminate the inhibition time only when, with a certain time delay, a further signal confirms the initially incorrectly assumed shifting intent as an actual shifting intent. In this case, the inhibition time is not predefined, but is determined on a case-by-case basis.

What is claimed is:

1. A vehicle comprising:
    an automatically actuated clutch disposed in a drive train between an engine and a manually shifted transmission having a shift lever, a clutching operation capable of being triggered via the shift lever synchronously with a respective initiated shifting operation; and
    at least one sensor for providing at least one signal directly or indirectly via the shift lever as a function of at least one of a position, relative position, force, travel, velocity, and acceleration of the shift lever, a respective shifting intent being detectable from the at least one signal, and for providing a reference signal for use in activating a predefined function, the reference signal corresponding to a reference position of the shift lever and for use in activating an inhibition time for the predefined function when the respective shifting intent is detected as a function of a deviation from a reference or normal state of at least one of the shift lever and an actuation linkage connected to the shift lever.

2. The vehicle as recited in claim 1 wherein the deviation corresponds to an overpushed position.

3. The vehicle as recited in claim 1 wherein the function having an inhibition time activated is performed after the inhibition time has elapsed only when predefined conditions are present.

4. The vehicle as recited in claim 1 wherein the inhibition time has a predefined magnitude.

5. The vehicle as recited in claim 4 wherein the predefined magnitude is variable.

6. The vehicle as recited in claim 1 wherein the function having an inhibition time activated is performed after the inhibition time has elapsed only when a confirmation signal occurs.

7. The vehicle as recited in claim 6 wherein the inhibition time is variable.

8. The vehicle as recited in claim 6 wherein the inhibition time is terminated by a termination signal following the reference signal at a time interval.

9. A method for shifting an automatically actuated clutch disposed in a drive train in a vehicle between an engine and a manually shifted transmission having a shift lever, a clutching operation capable of being triggered via the shift lever synchronously with a respective initiated shifting operation, the method comprising:
    detecting a respective shifting intent using a first signal, the first signal being capable of being directly or indirectly provided via the shift lever as a function of at least one of a position, relative position, force, travel, velocity, and acceleration of the shift lever; and
    activating an inhibition time for a predefined function using a reference signal when the respective shifting intent is detected as a function of a deviation from a reference or normal state of at least one of the shift lever and an actuation linkage connected to the shift lever, the reference signal corresponding to a reference position of the shift lever and being usable for activating the predefined function.

* * * * *